United States Patent [19]

Smith et al.

[11] Patent Number: 4,919,715

[45] Date of Patent: Apr. 24, 1990

[54] TREATING REFRACTORY GOLD ORES VIA OXYGEN-ENRICHED ROASTING

[75] Inventors: Jay C. Smith, Pearl River; Thomas H. McCord, Harvey, both of La.; Gregory R. O'Neil, Marmion, Australia

[73] Assignee: Freeport McMoRan Inc., New Orleans, La.

[21] Appl. No.: 201,952

[22] Filed: Jun. 3, 1988

[51] Int. Cl.$^5$ .............................................. C22B 11/00
[52] U.S. Cl. ...................................... 75/423; 423/29; 423/30; 423/31; 204/109
[58] Field of Search ................... 75/7, 83, 118 R, 105; 423/23, 47, 29, 30, 31; 204/109

[56] References Cited

U.S. PATENT DOCUMENTS

| | | | |
|---|---|---|---|
| 360,904 | 4/1887 | Parnell | 423/47 |
| 471,616 | 3/1892 | Leede | 75/118 R |
| 475,907 | 5/1892 | Waring | 75/118 R |
| 1,257,612 | 2/1918 | Kirchen | 423/47 |
| 1,818,846 | 8/1931 | Giles | 75/118 R |
| 2,596,580 | 5/1952 | McKay et al. | 75/118 R |
| 2,650,159 | 8/1953 | Tarr, Jr. et al. | 423/47 |

OTHER PUBLICATIONS

Grant, Julius, *Hackh's Chemical Dictionary*, 4th Ed. (1984) p. 585.

*Primary Examiner*—Robert L. Stoll
*Attorney, Agent, or Firm*—Fisher, Christen & Sabol

[57] ABSTRACT

Gold-containing ores, having refractory sulfidic matter or a combination of refractory sulfidic matter and refractory carbonaceous matter, are processed to recover their gold values. The process uses an ore roasting procedure that utilizes a two-state, fluidized bed roaster. The process also employs a pure oxygen atmosphere during roasting. A carbon-in-leach step is desirably used to extract gold values from the roasted ore.

19 Claims, 3 Drawing Sheets

TREATING REFRACTORY GOLD ORES VIA OXYGEN-ENRICHED ROASTING

BACKGROUND OF THE INVENTION

1. Field of the Invention

This invention relates to a method for the recovery of gold from refractory ores. More specifically, this invention relates to the use of oxygen-enriched roasting to recover gold from refractory ores.

2. Background Art

In recent years the mining industry has become increasingly involved with developing methods for extracting gold from complex refractory ores. This trend is due to the increasing scarcity of free milling gold ore deposits. Gold ores are considered refractory when their gold content cannot be efficiently recovered by standard cyanidation techniques. Such ores are often refractory because of their excessive content of metallic sulfides or organic carbonaceous matter or both. It is not clearly understood why the sulfides and carbonaceous material cause such gold ores to be refractory but the phenomenon is well known in the mining industry.

The presence of carbonaceous matter, alone, can be efficiently dealt with by processes recently developed. U.S. Pat. No. 4,289,532 to Matson et al., hereby incorporated by reference, discloses a process that treats carbonaceous ores with an oxidation step utilizing chlorine and, in certain applications, oxygen to oxidize the carbonaceous matter prior to a cyanide leach step. Although this process was intended primarily to treat ores containing carbonaceous matter, the process has also been found effective in treating gold ores containing low levels of sulfidic compounds in addition to carbonaceous matter. The sulfidic compounds are oxidized by contact with chlorine. At higher ore sulfide concentrations, the oxidation reactions continue to occur, but excessively high quantities of chlorine are required and the process can become too costly. More drastic ore treatment techniques, such as autoclaving or roasting, can be necessary for ores containing high concentrations of refractory sulfidic compounds.

Autoclaving is defined within the industry as a process involving high pressure oxidation of ore in slurry form. Such a procedure is one alternative to chlorination in gold extraction technology. An oxygen-rich gas is typically used, rather than air, to increase the reaction rate. Autoclaving procedures in this industry suffer from temperature limitations, such as the boiling point of liquid phases, and mechanical design complications, such as the practical design and use of an agitated pressure vessel or the pressure let-down of an abrasive slurry. The operating costs associated with autoclaving tend to be higher than the costs for roasting, because of these problems.

The roasting of ores and ore concentrates to enhance the recovery of gold and other minerals has been practiced in many parts of the world. U.S. Pat. Nos. 2,878,102 to Sternfels, 3,150,960 to Hunter, and 3,174,848 to Bruce describe roasting processes for treating various mineral-containing sulfidic ores. The fluidized bed technique is widely used today for roasting various sulfide concentrates. Fluid bed roasting has excellent heat and mass transfer characteristics and provides a very efficient mechanism for the destruction of the refractory components in an ore while maintaining the efficient control of process temperature.

U.S. Pat. Nos. 3,995,987 to MacAskill, 4,076,796 to Yuki, 4,111,158 to Reh et al., and 4,389,380 to Parks disclose fluid bed roasting processes for treating various ores other than gold-containing ores. In particular the MacAskill process roasts primarily phosphate ores in a two stage reactor with air. This process is concerned with the elimination of carbonaceous matter from the ore and does not address the elimination of refractory sulfidic matter.

Although fluid bed roasting is known in the gold mining industry and has become the most favored roasting technique used to treat sulfidic gold ore concentrates, it has not been applied to unconcentrated gold ores. Standard fluid bed roasting is satisfactory for those gold ores that can be concentrated, however, many ores, for various reasons, cannot be concentrated easily or efficiently. Roasting of such ores has been attempted without success using kilns. This technique is an ancient procedure and does not have the advantages listed above for fluid bed roasting. The gold mining industry has suffered from the lack of a process for the fluid bed roasting of unconcentrated refractory gold ores.

The roasting of the ore concentrates which are refractory because of their high sulfide content is usually conducted under exothermic conditions because the proportion of sulfides in such concentrates tend to be high or between about 20 and 22 percent or more expressed as sulfur. Such exothermic roasting operations are autogenous with air oxidation, while the roasting of unconcentrated ores, with their low sulfide concentration are usually endothermic and will usually require external heat or fuel input. This distinction may have contributed to the delay in the application of fluid bed roasting processes to unconcentrated refractory gold ores.

The technology for roasting refractory gold ores is concerned almost exclusively with reducing the sulfide content. The added presence of carbonaceous matter in the refractory sulfidic ores is a factor that requires separate and serious consideration by the industry as less refractory ores become scarce. if the carbonaceous matter is not substantially eliminated from a complex refractory ore, the carbon adsorbs gold during subsequent cyanide leach operations, thereby reducing the amount of gold recovery. The presence of graphitic carbon or highly condensed organic carbon in endothermic ores further complicates the problem since this type of carbon is difficult to burn at temperatures below about 1350° F. (732° C.) in air and gold recovery tends to suffer if the ore is subjected to temperatures above about 1200° F. (649° C.). The reasons for impairment of gold recovery for ores subjected to elevated temperatures are not clearly understood but are believed to relate to gold encapsulation by glassy fluxes, surface tarnishing and other similar mechanisms. Thus, the presence of carbonaceous matter, particularly graphitic carbon, and highly condensed organic carbon makes the roasting process much more difficult. Temperature exposure must be sufficient to substantially destroy the graphitic carbon, as well as the other carbonaceous matter and the sulfides, yet the temperature exposure must be minimized to prevent impairment of gold recovery. Balancing these two parameters has been difficult, if not impossible to accomplish with the existing technology.

Thus a need exists in the gold mining industry for a roasting method which will efficiently treat unconcentrated refractory gold ores containing sulfidic matter or sulfidic matter combined with carbonaceous matter. A need also exists in the gold mining industry for a roasting method which minimizes used roasting processes while, at the same time operating in a temperature range low enough to minimize loss of gold recovery through encapsulation or other similar mechanisms.

It is, therefore, an object of this invention to provide an efficient method of treating refractory sulfidic gold ores so that the gold values of the ores can be economically recovered.

It is also an object of this invention to provide a method of treating refractory gold ores containing both sulfidic and carbonaceous matter so that the gold values of the ores can be economically recovered.

It is also an object of this invention to provide a method for roasting refractory sulfidic gold ores which minimizes environmental emission problems.

Another object of this invention is to provide a method of roasting refractory sulfidic gold ores which employs a low enough temperature range to avoid the formation of glassy fluxes or other similar mechanisms which impair gold recovery.

SUMMARY OF INVENTION

The process of this invention is a roasting method for the recovery of gold from a gold-containing ore having refractory (i) sulfidic matter or (ii) a combination of sulfidic and carbonaceous matter. The process comprises the step of introducing into a first fluidized stage of a two stage fluid bed reactor the gold-containing ore, a fuel source, and oxygen-containing exhaust combustion gases from a second fluidized stage of the fluid bed reactor. Roasting the gold-containing ore between about 1000° F. (537.8° C.) and about 1200° F. (648.9° C.) then occurs in the first fluidized stage until sulfidic matter present in the gold-containing ore is substantially oxidized. The step of transferring the gold-containing ore from the first fluidized stage to the second fluidized stage then follows. Roasting between about 1000° F. (537.8° C.) and about 1200° F. (648.9° C.) and simultaneously feeding pure oxygen into the second fluidized stage occurs until the sulfidic and the carbonaceous matter present in the gold-containing ore is essentially, completely oxidized. The ore can then undergo quenching and standard or conventional processing to extract the gold.

Gold-containing ores having an excessive refractory content of sulfidic and carbonaceous matter are made amenable by the invented process to facilitate gold recovery by conventional processes such as carbon-in-leach adsorption. The preferred embodiment of the method involves roasting the refractory ore with pure oxygen at moderate temperatures. This occurs in a two-stage fluidized bed roaster wherein the ground ore is fluidized and in contact with a countercurrent flow of oxygen.

The use of pure oxygen promotes rapid combustion at minimum combustion temperatures and enables higher production rates per unit of equipment. Gold recovery efficiency is improved, relative to conventional roasting methods, by lower time-temperature exposure and environmental problems are lessened due to the smaller volume of discharge gas.

DETAILED DESCRIPTION OF THE INVENTION

The following description of the invented gold recovery process is directed to a refractory feed ore that contains concentrations of both sulfidic and carbonaceous matter that are "excessive" for common recovery processes to be effective. Refractory ores are considered to have a "high" content of sulfidic matter when the sulfur concentration is more than approximately 0.5 percent. Ores containing only sulfidic matter in concentrations that are excessive for common recovery processes to be effective can be treated by this method with essentially no changes in the process. The absence of refractory carbonaceous matter in a gold-containing ore allows the operating parameters of the method to be adjusted in order to achieve higher production rates than those possible with a refractory ore having both sulfidic and carbonaceous matter. The chemical and physical composition of a gold-containing ore contemplated for treatment by the invented process is presented in Table 1.

TABLE 1

| GROUND GOLD ORE CHEMICAL AND PHYSICAL COMPOSITION | |
|---|---|
| CHEMICAL COMPOSITION | |
| Carbonates | 10% to 30% |
| Sulfide Sulfur | .5% to 2.0% |
| Organic Carbon | .5% to 1.5% |
| PHYSICAL COMPOSITION | |
| Particle Size | 80% minus 100 mesh (149 microns) |
| Bulk Density | approximately 100 lb/cu. ft. (1602 Kg/cu. m.) |
| Moisture | approximately 0.5% |

Figure 1:
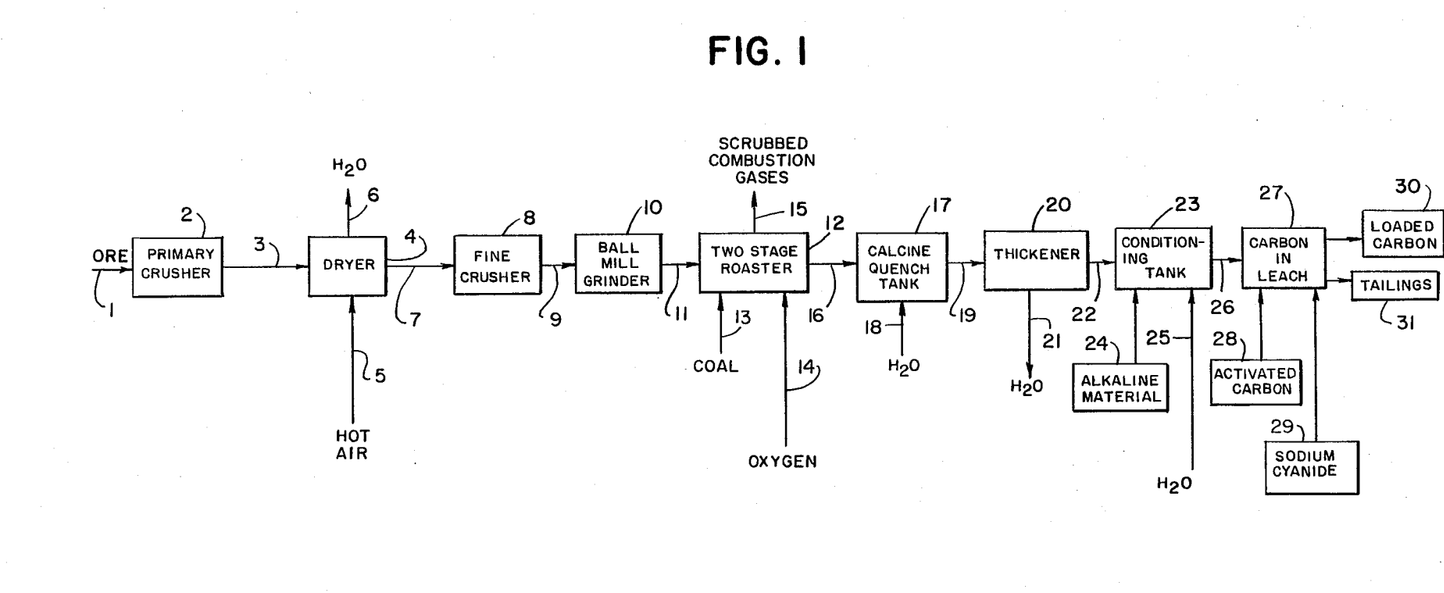
FIG. 1 is a block diagram of a gold recovery process which incorporates the preferred embodiment of the method of the present invention.

FIG. 1 illustrates the preferred embodiment of the invention for processing refractory gold-containing ore having both sulfidic and carbonaceous matter. The ore is passed through a line 1 to a primary crusher 2 from which the crushed ore is transferred through a line 3 to a dryer 4. The dryer 4 utilizes hot air 5 as the drying medium. The ore is dried to a moisture content of less than 2 percent and water vapor is removed through a line 6. The dry ore is next transferred via a line 7 to a fine ore crusher 8 where the ore particle size is reduced to about a ¼ inch (6.35 millimeters) diameter. The ore is then transferred via a line 9 to a dry ball mill grinder 10 where the ore is ground to 80 percent passing a 100 mesh (0.149 millimeter) sieve opening. The fine ground ore then passes through a line 11 to roasting equipment 12. Pure oxygen is added via a line 14 to the roasting equipment 12. A fuel source, preferably coal, is added through a line 13 to the roasting equipment 12. Fuel oil can also be used for the fuel source. Scrubbed combustion gases leave the roasting equipment 12 through line 15. The roasted ore or "calcine" exits the roasting equipment 12 and passes via a line 16 to the calcine quench tanks 17. Cold water 18 can be added to the calcine in the calcine quench tanks 17 through a line 18. Other coolants such as air can be used in substitution for the cold water. The calcine is cooled by contact with the water. The slurry produced in the quench tank, where water is added as the coolant, has a temperature of about 40° C. and is transferred through a line 19 to a solids-liquid separation equipment 20. The solids-liquid separation equipment 20 can be filters or thickeners. Excess water is removed and sent via a line 21 to a cooling tower and recycled to the calcine quench tanks 17. Of course, if a gas such as air is used as the coolant, no solids-liquid separation operation is necessary. In such a case water is added to produce a slurry for the subsequent gold extraction procedure such as a carbon-in-leach step 27.

Air-quenching normally results in slightly lower gold recovery efficiency than water quenching. A process modification is available that improves the overall efficiency of air-quenched systems. This modification involves adding from about 1 to 10 pounds (0.4536 to 4.536 kilograms) of a chlorine-providing compound such as chlorine, sodium hypochlorite, or potassium hypochlorite to the ore slurry. The ore slurry is then held for an extended retention time so that the slurry can be in contact with free chlorine provided by these compounds prior to the slurry entering the carbon-in-leach step 27. This small amount of chlorine is sufficient to neutralize or "destroy" most carbonaceous matter remaining after roasting. This use of chlorine minimizes variations in process results. For example, an over-roasted air-quenched calcine, achieving 75 percent gold extraction without pretreatment, responds well to 2.5 pounds per ton of ore (1.134 kilograms per 1,016 kilograms of ore) of sodium hypochlorite treatment and achieves an 86.3 percent gold recovery.

The thickened ore slurry is next transferred through a line 22 to a conditioning tank 23 to which an alkaline material 24 such as lime or soda ash can be added for pH adjustment prior to the calcine slurry entering the carbon-in-leach circuit 27. If needed, water can also be added through a line 25 to the conditioning tank 23. The ore slurry next passes via line 26 to a standard process for gold extraction. The preferred process for gold extraction is a carbon-in-leach circuit 27 to which activated carbon 28 and sodium cyanide 29 are added. In the carbon-in-leach circuit 27, the calcine slurry is simultaneously contacted by a cyanide leach solution and granular activated carbon. The gold is leached from the calcine slurry and adsorbed on the activated carbon. Such a carbon-in-leach circuit is described in U.S. Pat. No. 4,289,532 to Matson, et al. The gold-loaded carbon 30 can be further processed and the gold recovered by a number of methods well known in the industry. Carbon-in-pulp systems are very closely related to the above carbon-in-leach system and can also be used. Additionally, cyanide leaching/zinc cementation systems can also be used. These systems are extensively described in gold mining industry literature.

As used in this application, the term pure oxygen means an oxygen stream that contains at least about 80 percent oxygen by weight, preferably about 90 percent oxygen by weight, and most preferably at least about 95 percent oxygen by weight.

Figure 2:
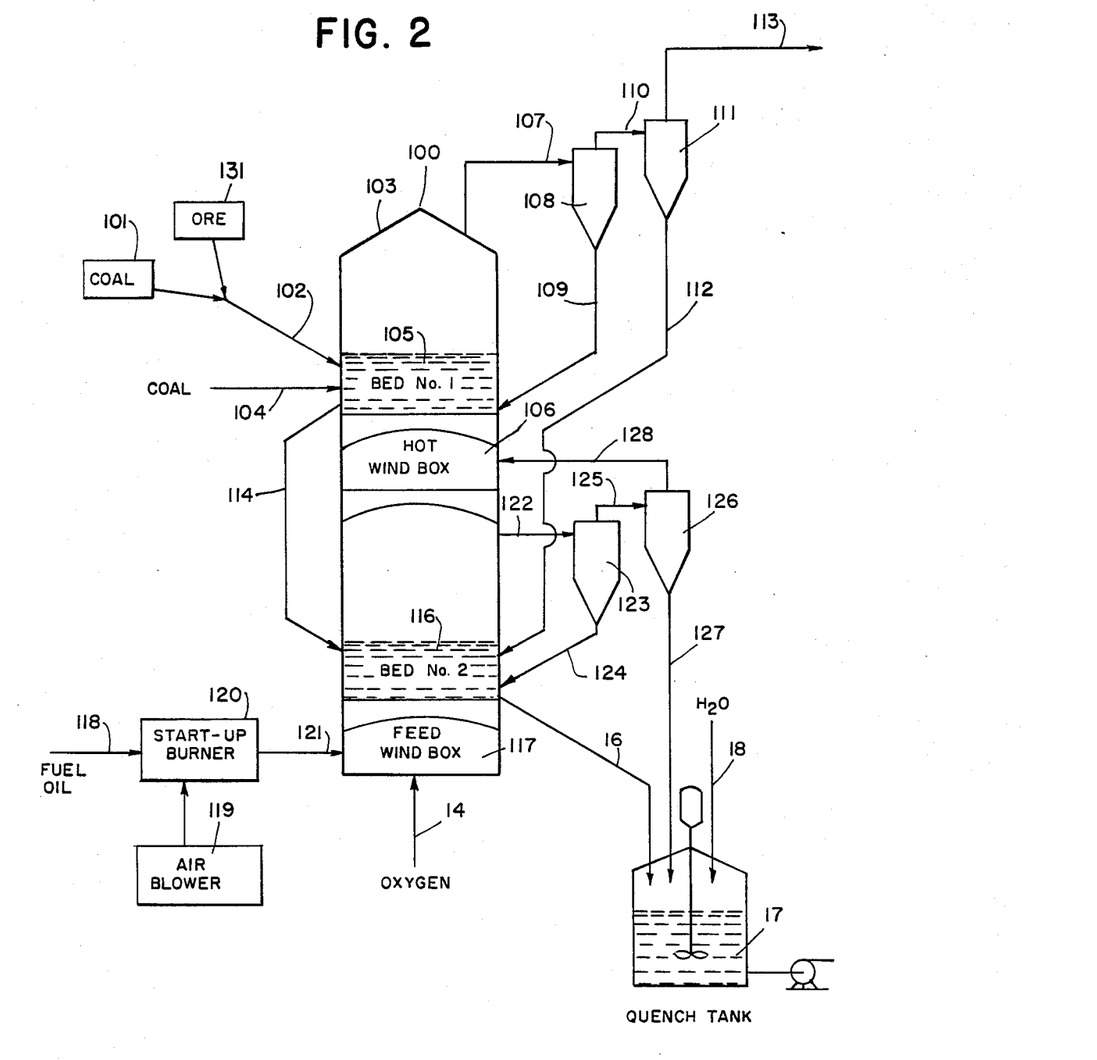
FIG. 2 is a diagram illustrating in detail the essential features of the roasting method and equipment used in the present invention.

FIG. 2 illustrates in more detail the essential features of the roasting equipment 12 of FIG. 1 and explains the roasting method desirably used in this invention. The roasting equipment 12 or "roaster" used in the preferred embodiment of the process comprises two stages 103 and 115 in a single vessel. Refractory gold ore 131 having approximate chemical and physical composition as shown in Table 1 is blended with ground coal 101 and injected via a line 102 into the first stage 103. If the carbonate content of the ore is below about 10 percent, lime or limestone are desirably added via the line 102 to retain the $SO_2$ in the bed in the same manner that occurs in flue gas desulfurizing units. Additional coal can be added, as required, to the first stage via a line 104. The ground coat has a bulk density of about 50 pounds per cubic foot (801 kilograms per cubic meter), a moisture content of less than about 5 percent, and a particle size of 80 percent being less than ⅛ inch (3.175 millimeters) diameter and 20 percent being less than 200 mesh (74 microns). The coal feed rate can range from approximately 23 pounds per ton of ore (10.4 kilograms per 1,016 kilograms of ore) to approximately 52 pounds per ton of ore (23.6 kilograms per 1,016 kilograms of ore) depending on the chemical composition of the ore to be treated. The roasting operation in the first stage 103 is performed at a temperature of between about 1000° F. and 1200° F. (537.8° C. and 648.9° C.) and preferably, between about 1025° F. and 1100° F. (551.7° C. and 593.3° C.). Coal addition is varied to maintain the roasting temperature in the range desired.

The first stage 103 receives, via a line 128, hot exhaust gas from the second stage 115 which, in the preferred embodiment, is fed with pure oxygen. The exhaust gas from the second stage in this embodiment is at a temperature of between about 1000° F. and 1200° F. (537.8° C. and 648.9° C.) and preferably, between about 1025° F. and 1100° F. (551.7° C. and 593.3° C.). The exhaust gas contains about 82 percent oxygen. The hot, oxygen-rich exhaust gas promotes rapid combustion of fuel, organic carbon, and sulfur in a fluidized bed 105 of the first stage 103. The second stage exhaust gas which enters the first stage 103 through a windbox 106, also serves as the fluidizing gas for the first stage fluidized bed 105. Since combustion in the first stage 103 is performed at very high capacity, the required retention time of ore in this stage is low or between about 5 to about 8 minutes. Most combustion is accomplished in the first stage 103. About 98 percent of ore sulfides, 75 percent of ore carbonaceous matter, and 98 percent of coal is combusted in the first stage 103. The discharge gas which exits the first stage 103 via a line 107 contains approximately 20 percent oxygen with the remainder being primarily carbon dioxide. This discharge gas is sent to a cyclone separator 108 which removes the coarse fraction of ore dust which is returned to the first stage 103 via a line 109. The partially "dedusted" discharge gas is then passed via a line 110 to a second cyclone separator 111 which removes the fine fraction of ore dust. The fine fraction of ore dust is transferred to the second stage 115 via a line 112. The dusted gas is removed from cyclone separator 111 through a line 113 for additional gas cleaning prior to discharge into the atmosphere.

The almost completely combusted material from the first stage 103 is transferred via a dropleg 114 to the second stage 115 where the oxidation of ore carbonaceous matter is essentially completed. The solids retention time in the second stage 115 is approximately the same or a lower retention time as that of the first stage 103. No fuel is normally required in the second stage 115 since enough heat is supplied by the oxidation of sulfidic and carbonaceous matter to maintain operating temperatures in this stage. Oxygen is supplied to a windbox 117 of the second stage 115 through a line 14. In addition to promoting combustion in the second stage 115, the oxygen serves as the fluidizing gas for the second stage 115 in a fluidized bed 116. For start up purposes, hot burner combustion gas is created by a startup burner 120 that is fed by fuel oil through a line 118 and air from air blower 119. The hot burner combustion gas is fed to the second stage 115 via line 121. The roasted ore exits the second stage 115 through the line 16 and passes to the calcine quench tank 17 to which water is added by the line 18. The discharge gas from the second stage exits the second stage 115 via a line 122 and passes to a cyclone separator 123 in which the crude fraction of ore dust is removed from the gas and returned through line 124 to the second stage 115. The partially scrubbed gas then passes via a line 125 to a second scrubber 126 in which the fine fraction of dust is removed from the gas and transferred via a line 127 to the calcine quench tank 17. The dedusted gas exits cyclone separator 126 and is sent via line 128 to the windbox 117 of first stage 106.

Roasting with pure oxygen has not been practiced in the gold mining industry. The use of pure oxygen in a roasting procedure has a number of significant advantages over air roasting. The following advantages offset the major economic disadvantage for oxygen roasting, which is the need to purchase or produce the required oxygen for the process. This disadvantage can be reduced if a high oxygen gas mixture such as oxygen enriched air is used, but such gases cause a corresponding decrease in the advantages achieved with the use of pure oxygen.

A first advantage of roasting with pure oxygen is that a shorter ore retention time is required when compared to processes using air. Oxygen roasters are much smaller than air roasters and still process the same ore throughput. For example, 3125 pounds per minute (1417.5 kilograms per minute) of ore can be treated in a 14 foot (4.3 meter) diameter roaster using the oxygen roasting process described herein while two 24 foot (7.3 meter) diameter similarly designed roasters are required to process the same ore throughput using air. Capital costs for oxygen roasting are, therefore, significantly less when compared to air roasting procedures.

A second advantage of roasting with pure oxygen is that the volume of discharge gas from oxygen roasting equipment is one-fifth the volume of discharge gas from air roasting. With the equipment discussed above for the first advantage, the volume of gas discharged from the oxygen roaster is 3165 standard cubic feet per minute (SCFM) compared to 18,800 SCFM for the two air roasters. Ore losses in the discharge gas of oxygen roasters, therefore, is less per ton of ore processed than for air roasters. The smaller volume of discharge gas enables oxygen roasters to more efficiently scrub the gas or to employ smaller gas scrubbing equipment or both. This again results in reduced capital costs for oxygen roasters and alleviates a problem often associated with roasters of releasing excessive $SO_2$ emissions.

A third advantage of roasting with pure oxygen is that oxygen roasting results in an ultimate gold recovery efficiency of about 1 to 2 percent higher than that obtained when air roasting is employed. When the oxygen roasting is used on a Robert's Mountains siltstone hosted ore, the invented process results in a gold recovery efficiency of 87.2 percent±1.6 percent. The use of the air roasting option on Robert's Mountains siltstone hosted ore results in a gold recovery efficiency for the process of 85.7 percent±0.5 percent. Robert's Mountains ore is an extremely refractory ore and gold recovery efficiencies for both the oxygen and air options of over 90 percent are obtained when less refractory ores are treated.

The determination that pure oxygen can effectively be used in place of air to roast refractory gold ores is believed to be one of the most important novel features of the present invention. Another novel feature of the preferred embodiment of this process is that, unlike other two-stage roaster systems, gas flow is countercurrent to the flow of solids or the fluidized bed. This arrangement allows the highest concentration of reactant or oxygen to contact the lowest concentrations of carbonaceous and sulfidic matter thereby increasing the reaction kinetics and allowing the proces to operate efficiently at lower temperatures. The efficient utilization of oxygen reduces the amount of combustion gas and fuel required by the process.

It was discovered by the inventors that roasting temperature is a very important parameter in the invented process and should not be allowed to vary much from the preferred range of about 1025° F. to 1100° F. (551.7° C. and 593.3° C.) although operation in the temperature range of 1000° F. to 1200° F. (537.8° C. and 648.9° C.) is allowable if operational constraints necessitate operating in that range. At temperatures significantly below about 1025° F. (551.7° C.), oxidation of carbonaceous material is reduced dramatically and gold recovery efficiency is reduced. In contrast, gold recovery efficiency is also reduced as the roasting temperature exceeds about 1150° F. (621° C.). For example, if the gold ore is heated to 1200° F. (648.9° C). during roasting, a decrease in gold recovery efficiency of 10 percent occurs. At still higher roasting temperatures, gold recovery efficiency decreases at an even faster rate. The temperature differential between the first fluidized stage and the second fluidized stage is desirably at a minimum or less than about 100° F. (38° C.).

Excessive thermal exposure is most detrimental to gold recovery efficiency if it occurs in the first stage. This is true whether the excessive thermal exposure is due to high roasting temperature or to long roasting retention time.

The inventors also discovered that, once the roasting process is begun, the need to eliminate carbonaceous matter becomes more important than the need to eliminate sulfidic matter. Apparently the carbonaceous matter is activated by the roasting operation and the well known tendency of carbonaceous matter to adsorb the gold-cyanide complex during the subsequent carbon-in-leach step is greatly enhanced. Gold recovery efficiency is thus reduced by even relatively small quantities of residual carbonaceous matter. Table 2 provides comparative data related to this phenomenon.

TABLE 2

| OXYGEN ROASTING: THE EFFECT OF RESIDUAL ORGANIC CARBON ON GOLD RECOVERY | |
|---|---|
| Residual Organic Carbon (%) In Roasted Ore | Gold Recovery (%) |
| 1.0 | 38 |
| 0.7 | 54 |
| 0.5 | 62 |
| 0.3 | 73 |
| 0.1 | 82 |
| 0.05 | 85 |

This data indicates that carbonaceous matter must be completely oxidized, to a concentration of less than about 0.05 percent, before optimum gold extractions can be obtained. At least 50 percent of the carbonaceous matter contained in the ore is oxidized in the first stage and, more typically, 70 to 80 percent of the carbonaceous matter is oxidized in the first stage. The second stage completes the oxidation of carbonaceoius matter reducing the concentration of carbonaceous matter in the roasted ore exiting that stage to the target value of less than 0.05 percent. In regards to the oxidation of sulfidic matter contained in the ore, at least 80 percent of the sulfidic matter is oxidized in the first stage, and more typically, over 90 percent of the sulfidic matter is oxidized in the first stage. Under optimum operating conditions, about 98 percent of sulfidic matter is oxidized in the first stage. In the second stage, the concentration of sulfidic matter is further reduced to a typical value of 0.05 percent. The residual concentrations of sulfidic and carbonaceous matter achieved by the invented process indicates that essentially complete combustion of the sulfidic and carbonaceous matter occurred since these concentrations are below the concentrations that can be accurately detected and measured by ordinary laboratory equipment.

The required oxidation can be achieved by the application of pure oxygen desirably in a process wherein the flow of gases and ore solids is countercurrent to each other. In the present invention, oxygen is introduced to the process in the second stage. This arrangement efficiently contacts the highest concentration of oxygen with the ore having the lowest concentrationof refractory matter.

EXAMPLES

The invention is further explained by reference to a series of tests performed and witnessed by the following Examples. The tests discussed are illustrative and not intended to be limiting.

Figure 3:
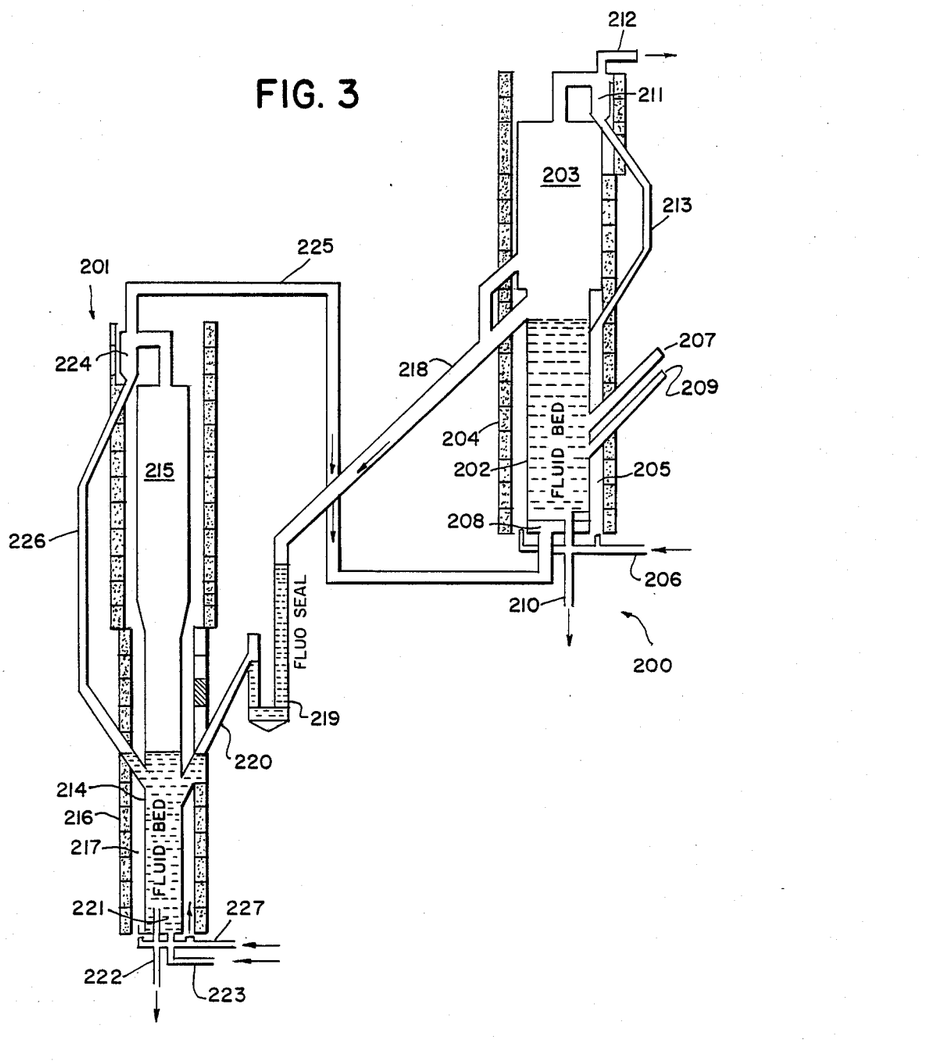
FIG. 3 is a diagram of two laboratory scale reactors or stages that are useful for demonstrating the inverted method.

A schematic of the two laboratory reactors or stages used in the tests is provided by FIG. 3. Both a first stage 200 and a second stage 201 were comprised of 12 inch (304.8 millimeter) stainless steel tubes 202 and 214 with expansion chambers 203 and 215 for dust disengagement that were encased in fire brick chimneys 204 and 216. The first stage 200 had an 18 inch (457.2 millimeter) expansion chamber 203 while the second stage 201 had a 15 inch 381 millimeter) expansion chamber 215. The annuluses 205 and 217 between the stainless steel tubes 202 and 214 and the fire brick chimneys 204 and 216 were fired with propane through lines 206 and 227. This procedure provided for the operation of an endothermic process in a small diameter fluid bed system without requiring excessive fuel additions. Such a procedure would not be required in full scale industrial equipment.

Ore with a moisture content of less than 0.4 percent by weight and which had been ground to 82 percent minus 100 mesh (149 microns) was fed into the first stage 200 via a 4 inch (101.6 millimeter) line 207 using a screw feeder (not shown). The coal feed point was about 6 inch (152.4 millimeter) below the ore feed point. Both feedlines were kept pressurized with air to prevent plugging and gas bypass. An underflow line 210 provided a means for sampling ore in the first stage 200. Solids from the first stage 200 were discharged through a 2 inch (50.8 millimeter) overflow line 218, 31.5 inches (800.1 millimeters) above the top of the windbox 221. The 2 inch (50.8 millimeter) overflow line 220 was connected to a 3 inch (76.2 millimeter) barometric seal leg 219, such as that sold by the trademark Fluoseal, which discharged via line 220 into the second stage 201 approximately 25.5 inches (647.7 millimeters) above the second stage windbox 221. Final product from the second stage 201 was discharged through an underflow pipe 222 and collected in drums (not shown).

Combustion gas, either oxygen or air, was supplied to the second stage windbox 221 via a line 223. Exhaust gases were partially cleaned in a single stage 6 inch (152.4 millimeter) hot cyclone 224 prior to their introduction via a line 225 into the first stage windbox 208. Dust removed from the second stage exhaust gases was returned to the second stage 201 via a 1½ inch (38.1 millimeter) underflow line 226 approximately 25 inches (647.7 millimeters) above the windbox 221. Exhaust gases from the first stage 200 were partially cleaned in a single stage 7.5 inch (190.5 millimeter) hot cyclone 211 prior to leaving the process via a line 212 for final cleanup in a baghouse and scrubber system (not shown). Dust removed from the first stage exhaust gases was returned via a 2 inch (50.8 millimeter) underflow line 213 approximately 25 inches (635 millimeters) above the windbox in the first stage.

Temperatures of each stage were monitored via 4 points in the first stage and 6 points in the second stage. During each test run, samples were periodically taken from both stages after relatively stable conditions had been maintained for at least two bed volumes. The key process parameters—temperature, ore retention time, and excess oxygen—were varied in the tests to determine optimum process conditions.

All roasted ore samples were evaluated via a standard carbon-in-leach gold extraction procedure. In this procedure, a 45 percent solids slurry of the roasted ore was contacted for 20 hours in rolling bottles with the equivalent of two pounds (0.9072 kilograms) of sodium cyanide per ton (1,016 kilograms) of ore and 20 grams per liter of preattrited 8×10 mesh 321G Westates carbon. The ore slurry was adjusted to a pH of 10.5±0.5 with lime.

EXAMPLE 1

Example 1 demonstrates the invented process using pure oxygen as the combustion gas. In Example 1, the total roasting retention time was 15.5 minutes or approximately 7.7 minutes per stage. Temperatures in both stages were held at a relatively low level such as 1078° F. (581° C.) and 1089° F. (587° C.) in the first and second stages, respectively. This example demonstrates that, if a sample is roasted in pure oxygen for a sufficient time at even a relatively low temperature, sufficient refractory species are destroyed so that acceptable gold recoveries result.

TABLE 3

| | OXYGEN ROASTING TEST | | | |
|---|---|---|---|---|
| Sample | Roasting Temp. (°F.) | Residual Sulfide Sulfur (%) | Residual Organic Carbon (%) | CIL Gold Recovery (%) |
| 1st. Stage | 1078 | 0.12 | 0.63 | 61.0 |
| 2nd. Stage | 1089 | 0.10 | 0.04 | 88.2 |

EXAMPLE 2

Example 2 demonstrates the invented process using pure oxygen as the combustion gas. In Example 2, the total roasting retention time was 10.7 minutes or approximately 5.4 minutes per stage. Roasting temperatures in the two stages were 1094° F. (590° C.) and 1092° F. (589° C.) in the first and second stages respectively. The retention time was much lower than in Example 1 and was responsible for the lower gold recoveries. In a commercial application, the operator would have the option of sacrificing gold recovery percentage for a higher production rate (lower roasting retention time) or vice versa.

TABLE 4
OXYGEN ROASTING TEST

| Sample | Roasting Temp. (°F.) | Residual Sulfide Sulfur (%) | Residual Organic Carbon (%) | CIL Gold Recovery (%) |
|---|---|---|---|---|
| 1st Stage | 1094 | 0.05 | 0.24 | 77.9 |
| 2nd Stage | 1092 | 0.03 | 0.04 | 85.6 |

EXAMPLE 3

In Example 3 the process of the invention was used with air instead of oxygen for the combustion gas. Otherwise the procedure used in this test was the same as Examples 1 and 2.

In Example 3, total roasting retention time was 51.6 minutes. This is far more retention time than required in oxygen roasting. Gold recovery efficiency was slightly less than that achieved in oxygen roasting. The test results are summarized in Table 5. This example demonstrates that, even if the roasting temperatures are held at moderate levels, 1114° F. and 1122° F. (601° C. and 605° C.), the additional thermal exposure required for air roasting reduces gold recovery significantly.

TABLE 5
AIR ROASTING TEST

| Sample | Roasting Temp. (°F.) | Residual Sulfide Sulfur (%) | Residual Organic Carbon (%) | CIL Gold Recovery Efficiency (%) |
|---|---|---|---|---|
| 1st. Stage | 1114 | 0.04 | 0.11 | 79.2 |
| 2nd. Stage | 1122 | 0.02 | 0.02 | 85.0 |

EXAMPLE 4

Example 4 is a test which demonstrates the invented process. The combustion gas used in the test was pure oxygen. The total ore retention time was 13.1 minutes or approximately 6.5 minutes per stage. The temperature of the first stage bed was held at an excessive 1290° F. (699° C.) and temperature of the second stage bed was held at 1089° F. (587° C.).

A partially roasted ore sample taken from the first stage resulted in 79.3 percent gold recovery while a roasted ore sample taken from the second stage resulted in 78.4 percent gold recovery. The reduced gold recovery from the second stage shows that once an ore is overheated, additional heating tends to damage the ore further and ore recovery is reduced. Ore recovery was reduced in this example even though sulfide sulfur and organic carbon combustion were satisfactory in both stages. This example also illustrates that overheating the ore in the first stage is particularly detrimental and that thermal exposure affects gold recovery more so than residual sulfide or organic carbon content.

TABLE 6
EFFECT ON GOLD RECOVERY EFFICIENCY OF OVERHEATING FIRST STAGE BED

| Sample | Roasting Temp. (°F.) | Residual Sulfide Sulfur (%) | Residual Organic Carbon (%) | CIL Gold Recovery (%) |
|---|---|---|---|---|
| 1st Stage | 1290 | 0.08 | 0.05 | 79.3 |
| 2nd Stage | 1068 | 0.03 | 0.03 | 78.4 |

EXAMPLE 5

Example 5 is similar to Example 4 except that the ore was overheated in the second stage instead of the first stage. The bed temperatures were 1087° F. (586° C.) in the first stage and 1317° F. (714° C.) in the second stage. The total retention time was 9.7 minutes. A first stage sample yielded a gold recovery of 60 percent and a second stage sample yielded a gold recovery of 80.4 percent. Thus the roasted ore of Example 5 yielded a higher gold recovery percentage than the ore of Example 4 even though the ore retention time of Example 5 was appreciably lower and the residual organic carbon was higher than that of Example 4. This example illustrates as in Example 4, that thermal exposure has to be minimized to maximize gold recovery. In neither of these two examples, was gold recovery efficiency as high as would have normally been expected with this process. Table 7 presents data collected from the tests of Example 5.

TABLE 7
EFFECT ON GOLD RECOVERY EFFICIENCY OF OVERHEATING SECOND STAGE BED

| Sample | Roasting Temp.(°F.) | Residual Sulfide Sulfur (%) | Residual Organic Carbon (%) | CIL Gold Recovery (%) |
|---|---|---|---|---|
| 1st. Stage | 1087 | 0.11 | 0.48 | 60.0 |
| 2nd Stage | 1317 | 0.48 | 0.06 | 80.4 |

We claim:
1. A method for treating refractory gold-containing ores, said ores having a concentration of substances selected from the group consisting of refractory sulfidic matter, carbonaceous matter and mixtures thereof, to make said ores amenable to gold recovery processes comprising roasting said ores with pure oxygen at a temperature of about 1000° F. to about 1200° F.

2. The method of claim 1 in which the ores are roasted at a temperature of about 1025° F. to about 1100° F.

3. A method for recovering gold from a gold-containing ore containing substances selected from the group consisting of refractory (i) sulfidic matter and (ii) a combination of sulfidic and carbonaceous matter, comprising the steps of:
(a) introducing into a first fluidized stage of a two stage fluid bed reactor said gold-containing ore, fuel, and exhaust combustion gases from a second fluidized stage of said fluid bed reactor;
(b) roasting said gold-containing ore between about 1000° F. and about 1200° F. in said first fluidized stage until sulfidic matter present in said gold-containing ore is substantially oxidized;
(c) transferring said gold-containing ore from said first fluidized stage to said second fluidized stage;

(d) roasting said gold-containing ore between about 1000° F. and about 1200° F. and simultaneously feeding pure oxygen into said second fluidized stage until said sulfidic and said carbonaceous matter present in said gold-containing ore is further oxidized thereby reducing said sulfidic and carbonaceous matter to a decreased level;

(e) quenching said roasted gold-containing ore and extracting said gold.

4. The method of claim 3 in which the fuel used in step (a) is coal.

5. The method of claim 3 in which the calcining operations of steps (a) and (c) are carried out at a temperature of between about 1025° F. and about 1100° F.

6. A method for recovering gold from a gold-containing ore containing substances selected from the group consisting of refractory-causing (i) sulfidic matter and (ii) a combination of sulfidic and carbonaceous matter, comprising the steps of:

(a) roasting said gold-containing ore at about 1000° F. to about 1200° F. in a first fluidized stage of a two-stage fluid bed reactor to form a first fluidized bed and simultaneously introducing in said first fluidized stage fuel and exhaust combustion gases from a second fluidized stage of said fluid bed reactor, said combustion gases being about 82 percent oxygen and in countercurrent flow to said first fluidized bed, said first fluidized bed being roasted for a period of time sufficient to oxidize substantial sulfidic matter;

(b) transferring said gold-containing ore from said first fluidized stage to said second fluidized stage to form a second fluidized bed;

(c) roasting said second fluidized bed at about 1000° F. to about 1200° F. in said second fluidized stage and simultaneously feeding pure oxygen into said second fluidized stage in countercurrent flow to said second fluidized bed, said second fluidized bed being roasted for a period of time sufficient to oxidize substantialy all remaining sulfidic matter and carbonaceous matter;

(d) quenching said roasted gold-containing ore; and (e) extracting said gold from said quenched gold-containing ore.

7. The method of claim 6 wherein said quenching is performed by a gas.

8. The method of claim 6 in which the roasting operations of steps (a) and (c) are carried out at a temperature of between about 1025° F. and about 1100° F.

9. The method of claim 6 in which the fuel used in step (a) is coal.

10. A method for recovering gold from a gold-containing ore containing substances selected from the group consisting of refractory-causing (i) sulfidic matter or (ii) a combination of sulfidic and carbonaceous matter, comprising the steps of:

(a) roasting said gold-containing ore at about 1000° F. to about 1200° F. in a first fluidized stage of a two stage fluid bed reactor to form a first fluidized bed and simultaneously introducing in said first fluidized stage fuel and exhaust combustion gases from a second fluidized stage of said fluid bed reactor, said combustion gases being about 82 percent oxygen and in countercurrent flow to said first fluidized bed, said first fluidized bed being roasted for a period of time sufficient to oxidize at least about 70 percent of sulfidic matter and at least about 50 percent of carbonaceous matter present in said first fluidized bed;

(b) transferring said gold-containing ore from said first fluidized stage to second fluidized stage to form a second fluidized bed;

(c) roasting said second fluidized bed at about 1000° F. to about 1200° F. in said second fluidized stage and simultaneously feeding pure oxygen into said second fluidized stage in countercurrent flow to said second fluidized bed, said second fluidized bed being roasted for a period of time sufficient to oxidize substantially all remaining sulfidic matter and carbonaceous matter;

(d) quenching said roasted gold-containing ore; and (e) extracting said gold from said quenched gold-containing ore.

11. The process of claim 10 wherein said quenching is performed by a gas.

12. The process of claim 10 wherein said fuel is only introduced into said first fluidized stage, said fuel being coal, and about 90 percent of said coal is consumed in said first fluidized stage.

13. The process of claim 10 wherein said first fluidized bed and said second fluidized bed are retained, respectively, in said first fluidized stage and said second fluidized stage for between about 5 and about 8 minutes.

14. The method of claim 10 in which the roasting operations of steps (a) and (c) are carried out at a temperature of between about 1025° F. and about 1100° F.

15. A method for recovering gold from a gold-containing ore containing refractory sulfidic matter or a combination of sulfidic and carbonaceous matter, comprising the steps of:

(a) introducing said gold-containing ore, at least one fuel, and substantially pure oxygen into a fluidized bed reactor;

(b) roasting said gold-containing ore between about 1000° F. and about 1200° F. in said fluidized bed reactor for sufficient time to substantially oxidize the sulfidic matter present in said gold-containing ore; and (c) extracting said gold from the roasted ore.

16. The method of claim 15 wherein the ore is roasted in a fluidized bed of exhaust combustion gases at a temperature of about 1000° F. to about 1200° F. before roasting in said substantially pure oxygen.

17. The method of claim 15 wherein said fuel is a solid fuel.

18. The method of claim 15 wherein said ore is roasted at a temperature of about 1025° F. to 1100° F.

19. The method of claim 15 wherein exhaust combustion gases are introduced into said fluidized bed reactor.

* * * * *

UNITED STATES PATENT AND TRADEMARK OFFICE
CERTIFICATE OF CORRECTION

PATENT NO. : 4,919,715

DATED : April 24, 1990

INVENTOR(S) : Jay C. Smith, Harvey McCord and Gregory R. O'Neil

It is certified that error appears in the above-identified patent and that said Letters Patent is hereby corrected as shown below:

In the drawings, Figure 2, reference numeral 115 should be applied to the second stage of the reactor below the first stage 103.

In column 2, line 41, delete "if" and insert --If--.

In column 3, line 3, after "which minimizes" insert --environmental emmission problems associated with presently--.

In column 3, line 32, delete "inverted" and insert --invented--.

In column 5, line 17, after "(0.4536 to 4.536 kilograms) insert --per ton of ore--.

In column 13, line 56, delete "or" and insert --and--.

Signed and Sealed this

Eighteenth Day of June, 1991

Attest:

HARRY F. MANBECK, JR.

Attesting Officer

Commissioner of Patents and Trademarks